Figure 1:
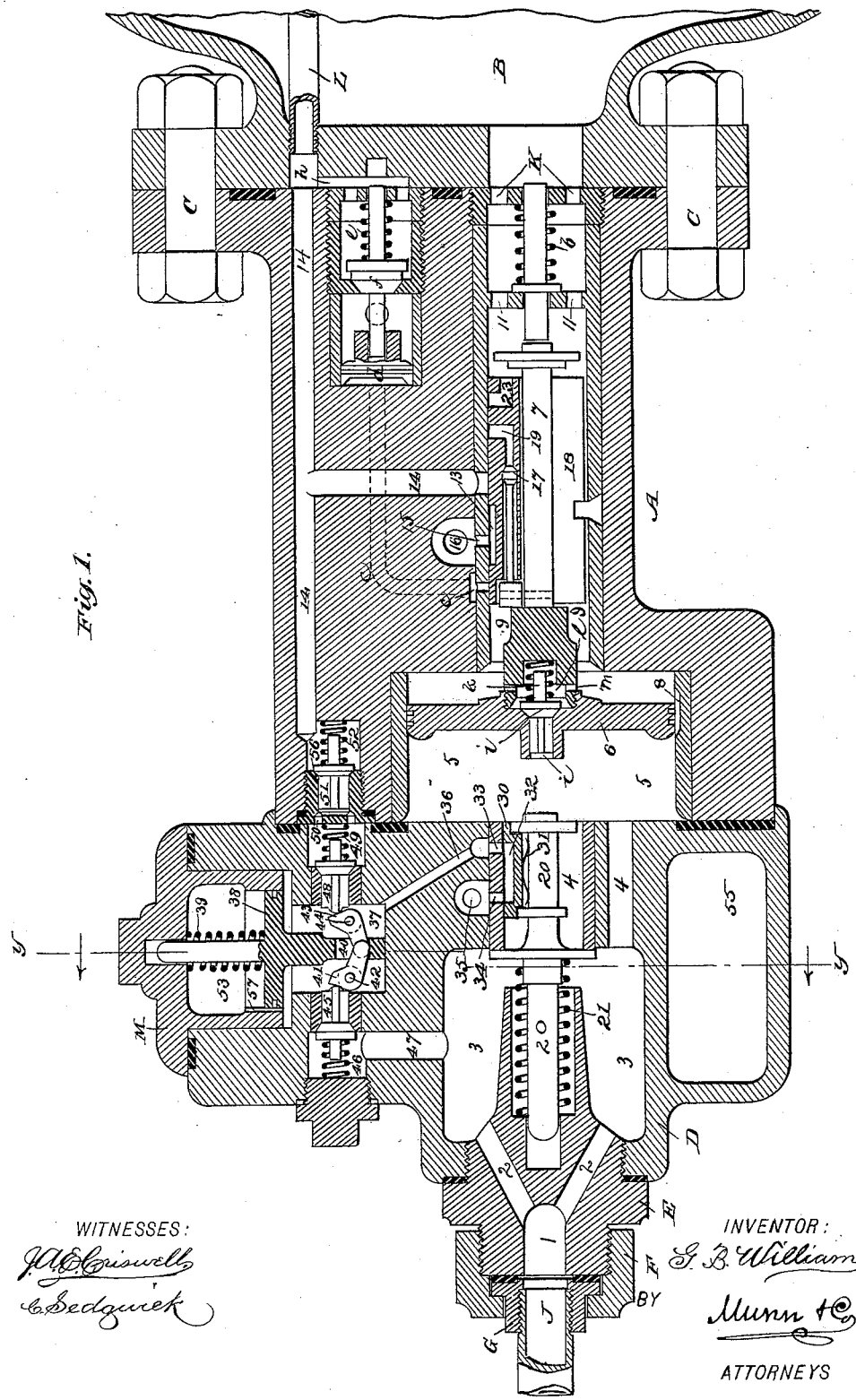

(No Model.) 3 Sheets—Sheet 2.

G. B. WILLIAMS.
AUTOMATIC AIR BRAKE.

No. 431,790. Patented July 8, 1890.

WITNESSES:
J. A. C. Criswell
C. Sedgwick

INVENTOR:
G. B. Williams
BY Munn & Co.
ATTORNEYS

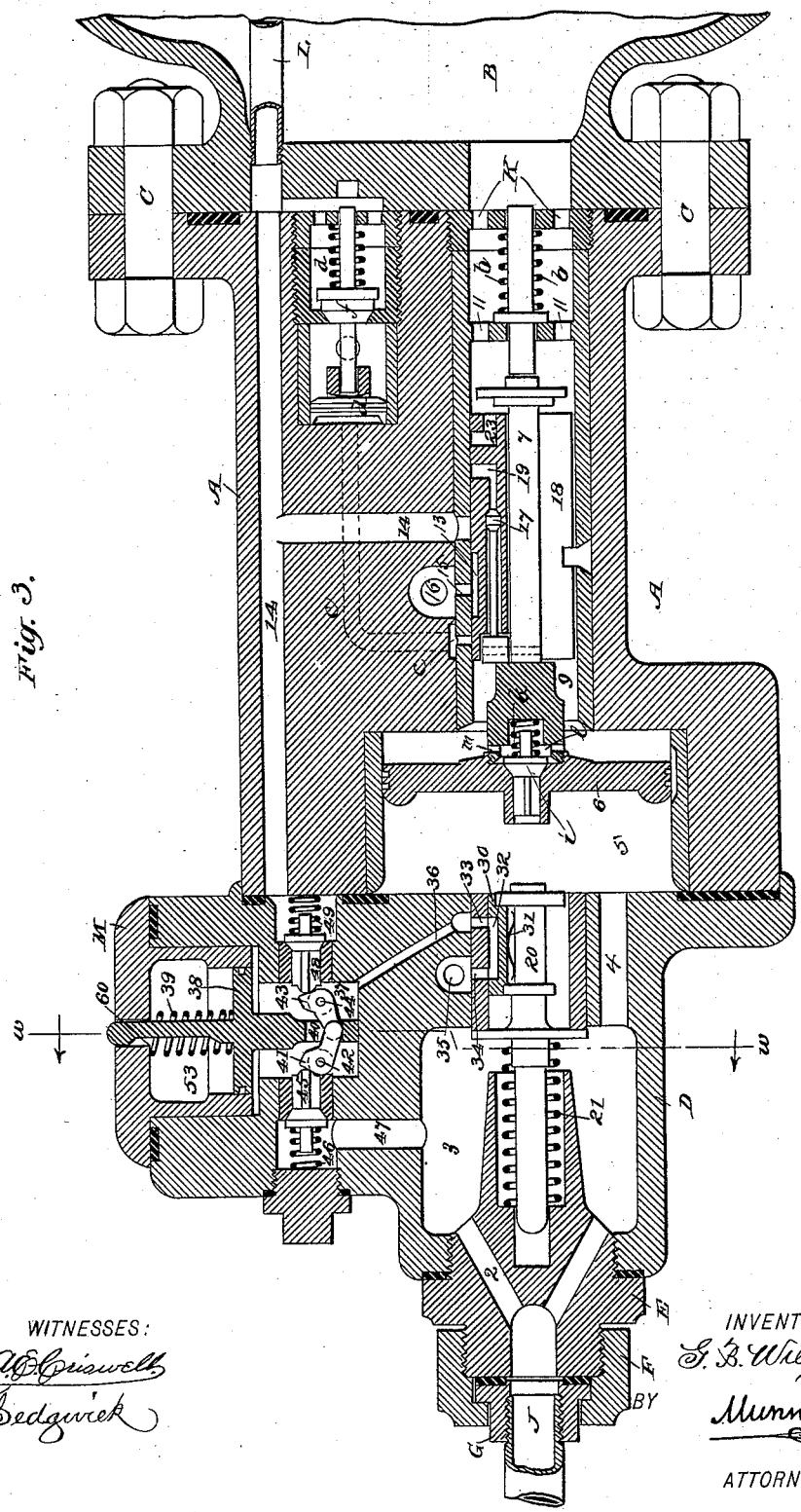

UNITED STATES PATENT OFFICE.

GEORGE BAYLEY WILLIAMS, OF PORTLAND, OREGON.

AUTOMATIC AIR-BRAKE.

SPECIFICATION forming part of Letters Patent No. 431,790, dated July 8, 1890.

Application filed November 26, 1889. Serial No. 331,678. (No model.)

*To all whom it may concern:*

Be it known that I, GEORGE BAYLEY WILLIAMS, of Portland, in the county of Multnomah and State of Oregon, have invented certain new and useful Improvements in Automatic Air-Brakes, of which the following is a full, clear, and exact description.

For convenience of description, and because the Westinghouse automatic air-brake is so well known as not to need minute description, I prefer to illustrate my improvements as applied to that system, though they are equally applicable in connection with other automatic air-brake systems.

One of the main objects of my invention is to provide certain new and useful improvements in automatic air-brakes whereby a more rapid and effective application of the brakes can be made in emergencies through making such application with greater initial force than now used, and having such force decreased after reaching its maximum by means of a gradual return-flow of compressed air from the brake-cylinder to the train-pipe till the pressures in both have equalized, or nearly so.

Another object of my invention is the elimination of shock as far as possible during emergency applications of the brakes as a result of the return-flow of compressed air from the brake-cylinder to the train-pipe and the quick equalization of the pressures in all brake-cylinders on a train that is consequent thereon and as a result of the gradual reduction of the braking pressure after reaching its maximum.

Another object of my invention is the equalization of the pressures in the auxiliary reservoir and the train-pipe at the close of an emergency application of the brakes by the engineer, which results from the communication being open between the auxiliary reservoir and the brake-cylinder almost as long as the return-flow of compressed air from the brake-cylinder to the train-pipe continues, such equalization of the pressures in the auxiliary reservoir and the train-pipe being intended to facilitate the release of the brakes after an emergency application of the brakes.

The invention consists, principally, of a direct closed passage leading from the train-pipe to the brake-cylinder, which is adapted to be forced open by the train-pipe pressure exerted on an auxiliary piston during emergency applications of the brakes, and to be held open in the same manner so long as the pressure on the inner side of said auxiliary piston exceeds the pressure on its outer side.

The invention also consists of certain parts and details and combinations of the same, as will be fully described hereinafter, and then pointed out in the claims.

Reference is to be had to the accompanying drawings, forming a part of this specification, in which similar letters and figures of reference indicate corresponding parts in all the figures.

Figure 2:
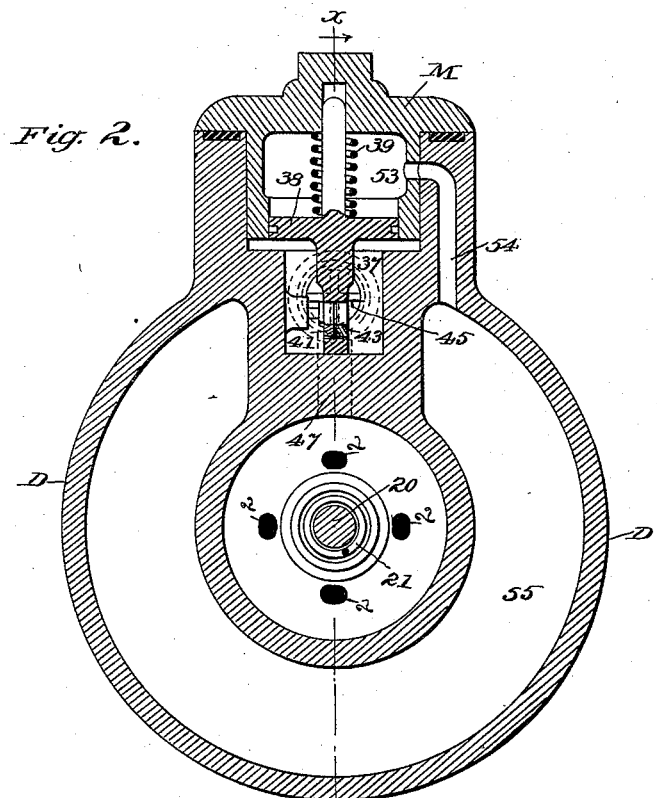
Figure 4:
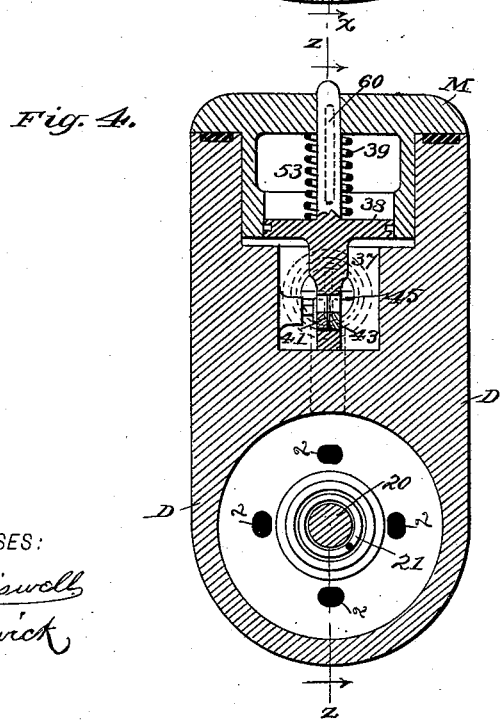

Figure 1 is a sectional side elevation of the improvement as applied and on the line $x\ x$ of Fig. 2. Fig. 2 is a transverse section of the same on the line $y\ y$ of Fig. 1. Fig. 3 is a sectional side elevation of a modified form of the improvement on the line $z\ z$ of Fig. 4, and Fig. 4 is a transverse section of the same on the line $w\ w$ of Fig. 3.

The improvement relates to that class of automatic air-brakes in which any breaking in two of the main air-pipe, or any considerable leakage of compressed air therefrom, however caused, will result in the automatic application of the air-brakes with a force proportionate to the pressure in the auxiliary reservoirs at such time, because a valve-controlling piston on each car will then open up communication between the auxiliary reservoir and the brake-cylinder. Ordinarily the engineer causes the application of the brakes by allowing compressed air to escape from the train-pipe to the atmosphere. In consequence of air having to travel from the neighborhood of each valve-controlling piston along the train-pipe to the exhaust-cock on the locomotive it follows that the brakes are not applied simultaneously on the several cars, but consecutively, beginning at the front and ending at the rear of the train. It has been found in practice that sudden stops produce injurious shocks, because the brakes are applied sooner on the front cars of a train than on the rear cars. It has also been demonstrated by the electro air-brake that if the brakes be applied simultaneously on all the cars the train, however long, will come to a quick and easy stop without shock.

Efforts have been made, with more or less success, to eliminate shocks in emergency stops by increasing the rapidity of the consecutive application of the brakes from the front to the rear of the train as the result of a local discharge from the train-pipe at each car following closely on the exhausting from the train-pipe at the locomotive. In one case the local discharge is from the train-pipe into the brake-cylinder, in another case into an expansion-chamber, and in a third case the local discharge is to the atmosphere. The latter method causes the most rapid consecutive application of the brakes, but wastes compressed air and does not fully eliminate shock. The above-mentioned difficulties are overcome by the improvements presently to be described.

A represents the valve-case, which is adapted to be fastened to the auxiliary reservoir B by bolts C or other means and to have communication with the auxiliary reservoir and brake-cylinder, respectively, as in the case of the Westinghouse "single-structure" brake.

D represents the lower cap of the triple-valve case, in which is screwed the nipple E, and from which connection is made with branch pipe J, leading to train-pipe, by means of union-nut F and sleeve G, into which latter the branch pipe J is screwed. A packing is used in making air-tight joints between the various parts.

At K and L connections are made with the auxiliary reservoir B and the brake-cylinder, respectively.

In my improvement an auxiliary slide-valve 30 is suitably connected to stem 20, on which it moves loosely, so as to be held tightly to its seat by means of spring 31, and it partakes in the reciprocating movements of stem 20. The slide-valve 30 governs the communication between the train-pipe and chamber 37 through port 33 and passage 36; also, between chamber 37 and the atmosphere through passage 36, port 33, exhaust-groove 32 in face of slide-valve 30, exhaust-port 34, and exhaust-outlet 35. The ports 33 and 34 are arranged in a bushing next to the slide-valve 30. The supplemental valve-chamber 37 is cast upon or secured to the triple-valve case D, said chamber being, preferably, in two sections, as shown, the inner of which is cast on the lower cap and is provided with lugs, to which the outer or cap section M is secured by bolts. The chamber 37 normally communicates with the atmosphere, as shown, and also preferably with chamber 53 through feed-groove 57, and thence with supplemental reservoir 55 through passage 54, as shown in Fig. 2. It is also adapted to communicate with the train-pipe through passage 47 and valve 45 and with the brake-cylinder through valve 48 and passage 14, also preferably through valve 51, past which is a leakage-groove 56. Valves 45, 48, and 51 are normally held to their seats by springs 46, 49, and 52, respectively. Valve 45 is actuated by lever 41, pivoted on pin 42, and valve 48 is actuated by lever 43, pivoted on pin 44, said levers being actuated by auxiliary piston 38 by means of grooves 40 in its stem or in any other suitable manner. On the outer side of auxiliary piston 38 is preferably a graduating-spring 39, though it is possible to dispense with its use when a supplemental reservoir 55 is used.

In operation the application of the brakes under such fraction of the maximum force as is required for making ordinary stops is effected, as in any well-known variety of automatic air-brake, by discharging a portion of the air from the train-pipe through the engineer's brake-valve, the preponderance of pressure thereby induced in the auxiliary reservoir moving the piston 6, stem 7, and main slide-valve 18 in the direction of graduating-stem 20 and compressing its spring 21. The graduating-valve 17 being unseated during the outward movement of piston 6, compressed air from the auxiliary reservoir will pass into the brake-cylinder through channel 14 as soon as port 19 registers with said channel, thus causing the application of the brakes. When the pressure in the auxiliary reservoir has been reduced by expansion into the brake-cylinder until it is nearly the same as the pressure in the brake-pipe, the spring 21 will expand, forcing stem 20 inward to its normal position, carrying piston 6 with it, closing graduating-valve 17, and thus preventing any greater application of the brakes until the train-pipe pressure is again reduced for that purpose.

In the operation of the triple valve, to which my improvement is shown to be applied, air from the main reservoir and train-pipe J passes through the passages 1 2, chamber 3, and passage or passages 4 into the piston-chamber 5, forcing the piston 6 inward till it meets with resistance from the spring $b$, at which time the feed-groove 8 will be uncovered, and the compressed air will pass through the same into the slide-valve chamber 9, which is at all times in communication with the auxiliary reservoir through passages 11 and K. It being desired to apply the brakes, the engineer will open his brake-valve and allow the pressure in train-pipe to become reduced by part of the same being exhausted to the atmosphere, afterward closing the brake-valve. As a result of such reduction of pressure in the train-pipe, the preponderance of pressure in the auxiliary reservoir will force the piston 6 outward, closing the feed-groove 8 and opening graduating-valve 17, thus allowing the compressed air in the auxiliary reservoir to enter passage 19 of slide-valve 18. A further outward movement of piston 6 and slide-valve 18 will cause the exhaust-groove 13 in face of slide-valve 18 to register with passage $c$ and with exhaust-port 15, so as to allow any compressed air that may be actuating auxiliary piston $d$ to escape to the atmosphere through exhaust-outlet 16, when the expansion of spring $e$ will force the piston $d$ outward and seat valve $f$, which governs the auxiliary exhaust from the brake-cylinder to the atmosphere from passage or passages L through exhaust-outlet $h$. A still further outward movement of slide-valve 18 will cause the passage 19 in slide-valve 18 to register with the passage 14, through which compressed air will pass from the auxiliary reservoir to the brake-cylinder and cause the application of the brakes with a force proportionate to the reduction of pressure which was made in the train-pipe, during which time the graduating-stem 20 will be forced outward and its spring compressed by the outward movement of piston 6. When the pressure in the auxiliary reservoir has been reduced by expansion into the brake-cylinder to nearly an equality with the pressure with the train-pipe, the graduating-spring 21 will expand, forcing piston 6 inward till graduating-stem 20 reaches its seat and closing graduating-valve 17, thus preventing any greater application of the brakes. If it is desired to apply the brakes with still greater force, the operation can be repeated, thus allowing a still greater air-pressure to pass from the auxiliary reservoir to the brake-cylinder.

It being desired to recharge the auxiliary reservoir without releasing the brakes, the pressure in train-pipe must be increased slowly in order to force piston 6 inward only till it meets with resistance from the spring $b$. The feed-groove 8 will then be uncovered and the auxiliary reservoir can be gradually recharged to nearly its normal pressure. It being desired to partially release the brakes, the pressure in train-pipe is sufficiently increased to force piston 6 farther inward and compress spring $b$ sufficiently to cause the exhaust-groove 13 to register with exhaust-port 15 and with passage 14, thus allowing part of the compressed air in the brake-cylinder to be exhausted to the atmosphere through passages 14, 13, 15, and 16. The engineer having closed his brake-valve, and the increase of pressure in train-pipe having ceased, the pressures in train-pipe and auxiliary reservoir will quickly equalize through feed-groove 8, when spring $b$ will expand till stem $a$ reaches its seat, thus forcing piston 6 outward till exhaust-groove 13 no longer registers with passage 14, when the reduction of the air-pressure in the brake-cylinder will cease. It being desired to fully release the brakes, the pressure in train-pipe is sufficiently increased to force piston 6 inward, so as to carry slide-valve 18 past and uncover passage $c$, through which the pressure in the auxiliary reservoir will pass to auxiliary piston $d$, forcing same toward and unseating valve $f$, when the compressed air in brake-cylinder will be exhausted through passages L and $h$, resulting in the rapid and complete release of the brakes. When the piston 6 approaches closely to its inner seat for the complete release of the brakes, it is preferable that the feed-groove 8 shall be closed in order that the full pressure in the train-pipe may be exerted to carry piston 6 inward till slide valve 18 passes by and uncovers passage $c$. After this has been done any considerable preponderance of pressure in the train-pipe will force open valve $i$ and compress spring $k$, when part of such preponderance of pressure will pass into the auxiliary reservoir through chamber $l$ and passages $m$, after which the expansion of spring $b$ will force piston 6 outward till stem $a$ reaches its seat. The excess pressure retained in the train-pipe will help to insure the release of the brakes to the rear of the train and will then equalize with the pressure in the auxiliary reservoir through feed-groove 8, which is to be of suitable size for the purposes for which it is intended. So far as the performance of its functions in ordinary braking is concerned—that is to say, in effecting the closure of communication between the train-pipe and auxiliary reservoir and the opening of communication between the auxiliary reservoir and the brake-cylinder in applying the brakes and the reverse operations in partly or wholly releasing the brakes, as well as recharging the auxiliary reservoir without releasing the brakes and temporarily retaining an excess pressure in the train-pipe when fully releasing the brakes—the triple valve, as shown, accords substantially with that set forth in my application for Letters Patent, Serial No. 326,562, filed October 10, 1889, and is not therefore claimed as of my present invention, saving as to the additional structural features by means of which it performs the further functions of causing a more rapid and effective application of the brakes in emergencies, of allowing the emergency application of the brakes to be made with as great an initial force as can safely be applied without causing the locking and sliding of the wheels, the force of such application decreasing as the momentum of the train decreases, so as to avoid the locking and sliding of the wheels, and of allowing the preponderance of pressure in the auxiliary reservoir and brake-cylinder during emergency applications of the brakes to flow back and equalize with the pressure in the train-pipe for the purpose of eliminating injurious shocks and to facilitate the release of the brakes after emergency stops, as presently to be described. Certain of its elements will, however, be herein specified, in order to render its construction and operative relation to other members of the brake mechanism fully intelligible. It may be applied in connection with any well-known variety of automatic air-brake.

The operation of the improvement, as shown in Figs. 1 and 2, which I consider the preferable form, will be first described at length. In the event of its becoming necessary to apply the brakes with great rapidity and with their greatest effective force, the engineer, by means of the valve at his command, instantly discharges sufficient air from the front end of the train-pipe to effect a reduction of about twenty pounds to the square inch therein, whereupon piston 6 of the triple valve is forced to the extreme outer limit of its stroke, carrying with it the stem 20 and slide-valve 30, which instantly uncovers the port 33 and discharges air from the train-pipe through the passage 36 into the auxiliary piston-chamber 37, forcing piston 38 outward, compressing its spring 39, and by means of grooves 40 in its stem operating levers 41 and 43, which force open check-valves 45 and 48, respectively. Air from the train-pipe will now rush in a large quantity through channel 47, past check-valve 45, through chamber 37, past check-valve 48, through passages 50, past check-valve 51, and through passage 14 into the brake-cylinder for the application of the brakes. It is preferable that this discharge of air from the train-pipe into the brake-cylinder shall be slightly in advance of the emergency discharge of compressed air from the auxiliary reservoir into the brake-cylinder through port 23 in slide-valve 18, though not essential. Check-valve 51 is preferably seated by a very light spring 52, so as to offer little obstruction to compressed air passing from the train-pipe into the brake-cylinder, while, on account of the leakage-groove 56 in its seat, it does not entirely prevent the return-flow of air from the brake-cylinder to the main air-pipe, while check-valve 48 is held open by lever 43, operated by piston 38. The result of the quick exhausting of air from the train-pipe into the brake-cylinder will be such a rapid reduction of pressure in the train-pipe as will cause the brakes to be almost instantly applied on the next car toward the rear, and so on from car to car consecutively in a very rapid manner. The simultaneous application of the brakes on all the cars in a train is impossible, except in the electro air-brake, and the additional use of electricity results in additional cost, as well as in additional chances of derangement of the mechanism, and consequently of failure of the brakes to act. The rapid reduction of pressure in the train-pipe and the consequent rapid consecutive application of the brakes on all the cars in a train are quickly followed by a return-flow of air from the brake-cylinders into the train-pipe from front to rear of train in the same consecutive order in which the brakes are applied till the pressures in the brake-cylinder and train-pipe have equalized, or nearly so, through the leakage-groove 56 past check-valve 51, valves 48 and 45 being meanwhile held off their seats by levers 41 and 43, actuated by auxiliary piston 38 or in any other suitable manner. As a result, the force of the application of the brakes commences to decrease on the front cars of a long train before the full force of the application has been reached on the rear cars, and thus prevents the injurious shock which is the ordinary result of emergency stops. The rapid decrease of the force of the application of the brakes to a small extent only, however, consecutively from the front to the rear of a train, following so closely on the consecutive application of the brakes in the same order, results in the braking force on all the cars in a train being equalized more rapidly than can be done in any other way without the aid of electricity, and hence produces very nearly the same effect in reference to eliminating shock as would result from a simultaneous application of the brakes on all the cars in a long train by the use of the electro air-brake. The initial application of the brakes during emergencies can be made with greater force than with any other brake on account of the subsequent reduction of braking-pressure caused by the return-flow of the compressed air from the brake-cylinder to the train-pipe after the brakes have been initially applied, which is sufficient to prevent the locking and sliding of the wheels throughout the operation, and hence permits of the application of the brakes being initially made with a greater force than at present. While the pressure in the auxiliary reservoir preponderates over that in the train-pipe the piston of the triple valve will be held against its outer seat, and there will be open communication between the auxiliary reservoir and the brake-cylinder through passages 23 and 14, so that the return-flow of compressed air to the train-pipe will be equally from the brake-cylinder and from the auxiliary reservoir until the pressures have equalized, or nearly so, on both sides of main piston of triple valve, when the expansion of graduating-spring 21 will move piston 6 inward far enough to close the communication between the auxiliary reservoir and the brake-cylinder. On account of such equalization of the pressures on both sides of main piston of triple valve the brakes can be readily released whenever the engineer increases the pressure in the train-pipe for that purpose. As the closing of the communication between the auxiliary reservoir and the brake-cylinder after an emergency application of the brakes is coincident with the establishment of communication between chamber 37 and the atmosphere through passages and ports 36, 33, 32, 34, and 35, which so reduces the pressure in chamber 37 that the preponderance of pressure in chamber 53 and supplemental reservoir 55 forces piston 38 inward and allows check-valve 48 to be seated, it follows that the return-flow of compressed air from the brake-cylinder to the train-pipe will cease very nearly as soon as the communication between the auxiliary reservoir and the brake-cylinder is closed, which stops the return-flow of compressed air from the auxiliary reservoir through the brake-cylinder to the train-pipe. While the compressed air is flowing from the train-pipe to the brake-cylinder it is also flowing through feed-groove 57, chamber, 53, and passage 54 into supplemental reservoir 55, which aids in the sudden reduction of the pressure in the train-pipe, although not specially designed for this purpose. About the time that the pressures have equalized, or nearly so, in the brake-cylinder, auxiliary reservoir, and train-pipe the pressures have also become equal on both sides of piston 38, when the expansion of spring 39 will force piston 38 inward and allow check-valves 45 and 48 to be seated closely by the expansive force of springs 46 and 49, respectively. The expansion of graduating-spring 21 will force stem 20 inward, carrying with it piston 6 and slide-valve 18, closing graduating-valve 17, and thus severing the communication between the auxiliary reservoir and the brake-cylinder. The expansion of the graduating-spring 21 also causes the return of the slide-valve 30 to its normal position, severing the communication between the train-pipe and chamber 37 and opening up communication between the chamber 37 and the atmosphere through passage 36, port 33, exhaust-groove 32, exhaust-port 34, and exhaust-outlet 35. The compressed air in supplemental reservoir 55 will at the same time be exhausted in the same manner after passing into chamber 53, and thence through groove 57 into the chamber 37, thus leaving all the parts in proper order for another emergency stop in the same manner when desired. In case the train-pipe should be severed during an emergency application of the brakes the pressure in chamber 37 will be instantly so reduced by passing to the atmosphere through passage 36 and port 33, the drip-cup 3, passages 2 and 1, and train-pipe J that the preponderance of pressure thereby induced in supplemental reservoir 55 and chamber 53, together with the expansive force of spring 39, will force piston 38 inward and allow check-valve 48 to be seated closely by the expansion of its spring 49 in order to prevent any further reduction of the braking-pressure in the brake-cylinder. In case the use of the spring 39 is dispensed with the piston 38 will not move inward when the air-pressures on both sides of it have equalized. When, however, the slide-valve 30 has returned to its normal position, so as to exhaust the pressure from chamber 37 suddenly, the preponderance of pressure thereby induced in chamber 53 and supplemental reservoir 55 will force piston 38 inward and result as previously described; also, in case the train-pipe should be severed during an emergency application of the brakes the loss of pressure from chamber 37 through passage 36 and port 33, the drip-cup 3, passages 2 and 1, and train-pipe J will induce such a preponderance of pressure in chamber 53 and supplemental reservoir 55 as will force piston 38 inward with similar results.

In the modified form of my improvement shown in Figs. 3 and 4 two separate and distinct modifications are illustrated, either or both of which changes may be made as desired. In the first place, the supplemental reservoir 55 is omitted, also the feed-groove 57, and as a consequence it is necessary to have constant communication between chamber 53 and the atmosphere, which is preferably by means of grooves 60 in outer stem of piston 38, so that normally dirt is excluded from chamber 53. In such case it is preferable to make the spring 39 much stronger than when a supplemental reservoir is used. This will render it more difficult to move piston 38 outward and render it necessary that valve 48 shall be held to its seat by a spring 49, that is no stronger than is actually necessary for seating valve 48. Spring 39 must be of sufficient strength to force piston 38 inward whenever the pressure in chamber 37 is suddenly reduced by being exhausted through passage 36 and port 33, either through the exhaust-outlet 35 or by way of the train-pipe, in case the latter is severed, as previously described. With these exceptions the operation will be similar to that previously described.

The second modification consists of the omission of the auxiliary check-valve 51. In such case the lever 43 should barely keep check-valve 48 from its seat when piston 38 is at the outer limit of its travel, and valve 48 should be seated by a very light spring. It would be difficult to regulate the return-flow of air from the brake-cylinder to the train-pipe as fully this way as when the groove 56 past valve 51 is used, though it might be near enough for all practical purposes. The valve 48 would seat closely, as before described, whenever the pressure in chamber 37 was so reduced as to cause the preponderance of pressure thereby induced in chamber 53 to force piston 38 to the inner limit of its travel.

The auxiliary piston or a diaphragm may cause the communication between the brake-cylinder and the train-pipe to be held open in any other suitable manner till the pressures have equalized, or nearly so, after emergency stops without departing from the spirit of my invention.

The check-valve 48 may be caused to leave its seat by air-pressure admitted into chamber 37, or it may only leave its seat coincidently with and through the outward movement of piston 38 without departing from the spirit of my invention.

The auxiliary slide-valve 30 may be attached to a lower stem of main triple-valve piston without departing from the spirit of my invention.

The equalizing return of compressed air from the brake-cylinder to the train-pipe for the purpose of eliminating shock during emergency stops may be combined with the Westinghouse quick-action brake or with any other quick-action brake without departing from the spirit of my invention in this respect.

Either or both of the valves 45 and 48 may be coupled to the levers by which they are actuated or otherwise suitably connected to the stem of piston 38, so as to only move coincidently with the movement of piston 38, without departing from the spirit of my invention.

Having thus described my invention, I claim as new and desire to secure by Letters Patent—

1. In a brake mechanism, a closed passage in communication with the train-pipe and the brake-cylinder, which is adapted to be forced open when the main piston of triple valve reaches its outer seat by the admission of the train-pipe air to an auxiliary piston or diaphragm, which is normally seated by the expansion of a spring, during which time said auxiliary piston is in communication with the atmosphere on both its sides, and which passage is adapted to be closed when the air-pressures on both sides of said auxiliary piston have equalized through a leakage-groove connecting the chambers on the opposite sides of said piston, substantially as shown and described.

2. In a brake mechanism, the combination, with a closed passage connecting the main pipe with a brake-cylinder, of an auxiliary piston or diaphragm normally seated by the expansion of a spring, during which time the said piston is in communication with the atmosphere on both its sides, which auxiliary piston or diaphragm is adapted to be moved outward, so as to open said closed passage by the admission of the train-pipe air to its inner side, when the main piston of triple valve reaches its outer seat, and which auxiliary piston is adapted to be moved to its inner seat by the expansion of its spring and to allow the communication between the train-pipe and the brake-cylinder to be severed as soon as the air-pressures have equalized on both its sides through a small leakage-groove connecting the chambers on the opposite sides of said piston, substantially as shown and described.

3. In a brake mechanism, the combination, with a passage connecting the main air-pipe with a brake-cylinder, of a closing device for closing said passage and an auxiliary piston or diaphragm connected with the said closing device and adapted to be actuated by a preponderance of train-pipe pressure to force open the said closing device during an emergency application of the brakes and coincidently with the establishment of communication between the auxiliary reservoir and the brake-cylinder, substantially as shown and described.

4. In a brake mechanism, the combination, with a passage connecting the train-pipe with a brake-cylinder and spring-pressed valves arranged in the said passage and serving to hold the same closed under ordinary circumstances, of an auxiliary piston or diaphragm connected with the said valves and adapted to be actuated by a preponderance of train-pipe pressure to force open said valves during an emergency application of the brakes and coincidently with the establishment of communication between the auxiliary reservoir and the brake-cylinder, substantially as shown and described.

5. In a brake mechanism, the combination of a chamber or casing having direct connections to a brake-cylinder and to a train-pipe, respectively, valves controlling the communication between said connections, and a piston or diaphragm which is independent of and unconnected with the main piston of triple valve and is adapted to be actuated by a preponderance of train-pipe pressure to force open said valves during an emergency application of the brakes and coincidently with the establishment of communication between the auxiliary reservoir and the brake-cylinder, substantially as shown and described.

6. In a brake mechanism, the combination of a chamber or casing having direct connections to a brake-cylinder and to a train-pipe, respectively, valves controlling communication between said connections, a piston or diaphragm which is independent of and unconnected with the main piston of triple valve and is adapted to be actuated by a preponderance of train-pipe pressure in direction to impart opening movement to said valves during an emergency application of the brakes and coincidently with the establishment of communication between the auxiliary reservoir and the brake-cylinder and to hold said valves open till the pressures in the train-pipe brake-cylinder and auxiliary reservoir have equalized, or nearly so, during an emergency application of the brakes, and an auxiliary check-valve which does not prevent but merely regulates the speed of the return-flow of compressed air from the brake-cylinder to the train-pipe, substantially as shown and described.

7. In a brake mechanism, the combination, with a triple valve, of a supplemental chamber or casing having passages leading to a brake-cylinder and a train-pipe, respectively, supplemental valves controlling the communication between said passages, a supplementary piston operating independently of the main piston of triple valve and adapted to be actuated by a preponderance of train-pipe pressure to impart opening movement to said supplemental valves during an emergency application of the brakes and coincidently with the establishment of communication between the auxiliary reservoir and the brake-cylinder, and a passage establishing communication between said supplemental piston-chamber and a train-pipe, substantially as shown and described.

8. In a brake mechanism, the combination, with a triple-valve, of a supplemental chamber or casing having passages leading to a brake-cylinder and to a train-pipe, respectively, supplemental valves controlling communication between said passages, a piston adapted to impart movement to said valves, and a passage establishing communication between said piston-chamber and a train-pipe through an auxiliary slide-valve actuated by the main piston of triple valve, substantially as shown and described.

9. In a brake mechanism, the combination of a triple valve having an auxiliary slide-valve and valve-bushing provided with ports and passages for the admission and exhaust of air to and from a supplemental valve-chamber connected with the train-pipe and having passages leading to the brake-cylinder and to the train-pipe, respectively, supplemental valves controlling the communication between said passages, a piston or diaphragm moving in said supplemental valve-chamber in position to impart opening movement to said supplemental valves, a check-valve governing the brake-cylinder passage of the supplemental valve-chamber, and a spring or springs acting to seat the supplemental and check valves, substantially as shown and described.

10. In a brake mechanism, the combination, with a triple valve, of a supplemental chamber or casing having passages leading to a brake-cylinder and to a train-pipe, respectively, supplemental valves controlling the communication between said passages, a piston adapted to impart movement to said valves, a passage establishing communication between the inner side of said piston and a train-pipe governed by an auxiliary slide-valve actuated by the main piston of triple valve, a supplemental reservoir communicating with the outer side of said piston, and a feed-groove past said piston connecting the inner and outer chambers, substantially as shown and described.

11. In a brake mechanism, the combination, with a triple valve, of a supplemental chamber or casing having passages leading to a brake-cylinder and to a train-pipe, respectively, supplemental valves controlling the communication between said passages, a piston adapted to impart movement to said valves, an auxiliary check-valve which regulates the return-flow of compressed air from the brake-cylinder to the train-pipe, a passage establishing communication between the inner side of the auxiliary piston and the train-pipe governed by an auxiliary slide-valve actuated by the main piston of triple valve, a graduating-spring acting on the outer side of said piston, a supplemental reservoir communicating with the outer side of said piston, and a feed-groove past said piston connecting the inner and outer chambers, substantially as shown and described.

12. In a brake mechanism, the combination, with a triple valve, of a supplemental chamber or casing having passages leading to a brake-cylinder and to a train-pipe, respectively, supplemental valves controlling the communication between said passages, a piston adapted to impart movement to said valves, an auxiliary check-valve which regulates the return-flow of compressed air from the brake-cylinder to the train-pipe, a passage establishing communication between the inner side of the auxiliary piston and the train-pipe governed by an auxiliary slide-valve actuated by the main piston of triple valve, and a graduating-spring acting on the outer side of said piston in a chamber in which the piston is mounted, substantially as shown and described.

13. The combination, in a triple-valve device, of a case or chest, a piston fixed upon a stem and working in a chamber therein, a valve moving with the piston-stem and governing ports and passages in the case leading to connections with an auxiliary reservoir and a brake-cylinder and to the atmosphere, respectively, an auxiliary valve actuated by the piston-stem and controlling communication between passages leading to connections with a main air-pipe and with an auxiliary piston-chamber, respectively, supplemental valves controlling the communication between said auxiliary piston-chamber and the train-pipe and brake-cylinder, respectively, a piston adapted to impart movement to said valves, an auxiliary check-valve which regulates the return-flow of compressed air from the brake-cylinder to the brake-pipe, a passage establishing communication between the inner side of the auxiliary piston and the train-pipe governed by an auxiliary slide-valve actuated by the main piston of triple valve, a graduating-spring acting on the outer side of said piston, a supplemental reservoir communicating with the outer side of said piston, and a feed-groove past said piston connecting the inner and outer chambers, substantially as shown and described.

14. The combination of the brake-cylinder, the brake-pipe, the car-reservoir, and the main triple-valve piston with a passage leading from the train-pipe to an auxiliary piston-chamber for locally exhausting the train-pipe through said auxiliary piston-chamber to the brake-cylinder and also to a supplemental reservoir, and with means whereby said passage is opened by lowering the pressure in the train-pipe in making an emergency stop and closed when the pressures in the train-pipe and auxiliary reservoir have equalized, or nearly so, or when the pressures in the train-pipe and supplemental reservoir have equalized, or nearly so, during an emergency stop, substantially as shown and described.

15. The combination of the brake-cylinder, the train-pipe, the car-reservoir, the main triple-valve piston, and the main slide-valve with an auxiliary slide-valve, a passage leading from the train-pipe to an auxiliary piston-chamber for locally exhausting the brake-pipe pressures through said chamber to the brake-cylinder, or to the brake-cylinder and also to a supplemental reservoir, and with means whereby said passage is opened by lowering the pressure in the train-pipe in making emergency stops and closed when the pressures in the train-pipe and auxiliary reservoir have equalized, or nearly so, or when the pressures in the train-pipe and supplemental reservoir have equalized, or nearly so, during emergency stops, also with means whereby the great preponderance of pressure in the brake-cylinder and auxiliary reservoir during emergency stops may flow back and equalize with the pressure in the train-pipe after the brakes have been applied for the purpose of eliminating injurious shock, substantially as shown and described.

16. In a brake mechanism, the combination of the train-pipe, an auxiliary reservoir, a brake-cylinder, a triple valve, and an auxiliary-valve device actuated by the main piston of triple valve for admitting air during an emergency application of the brakes directly from the train-pipe to an auxiliary piston-chamber, the piston of which is actuated by a preponderance of train-pipe pressure to open the communication between said piston-chamber and a passage leading to a check-valve, which being forced from its seat allows the train-pipe pressure to pass into the brake-cylinder coincidently with the establishment of communication between the auxiliary reservoir and the brake-cylinder, and a groove in the seat of said check-valve by means of which the compressed air in the brake-cylinder can afterward flow back more slowly into the train-pipe till the pressures in auxiliary reservoir, brake-cylinder, and train-pipe have nearly equalized during an emergency application of the brakes, substantially as shown and described.

17. In a brake mechanism, the combination of a train-pipe, an auxiliary reservoir, a brake-cylinder, a triple valve, and an auxiliary-valve device actuated by the piston of triple valve for admitting air in the application of the brake directly from the train-pipe to an auxiliary piston-chamber, and thence to the brake-cylinder through two check-valves, one of them being a non-return valve which is held from its seat by suitable mechanism till the pressures in the train-pipe and brake-cylinder have equalized, or nearly so, during an emergency application of the brakes, the other valve, when seated, regulating the rapidity of the return-flow of air from the brake-cylinder to the train-pipe, substantially as shown and described.

18. In a fluid-brake mechanism, the combination of the slide-valve 30 and its connections with the passage 36, chamber 37, piston 38, levers 41 and 43, valves 45 and 48, springs 46 and 49, passages 47 and 14, feed-groove 57, chamber 53, passage 54, and supplemental reservoir 55, substantially as shown and described.

19. In a fluid-brake mechanism, the combination of the slide-valve 30 and its connections with the passage 36, chamber 37, piston 38, spring 39, levers 41 and 43, valves 45 and 48, springs 46 and 49, passages 47 and 14, feed-groove 57, chamber 53, passage 54, and supplemental reservoir 55, substantially as shown and described.

20. In a fluid-brake mechanism, the combination of the slide-valve 30 and its connections with the passage 36, chamber 37, piston 38, spring 39, levers 41 and 43, valves 45 and 48, springs 46 and 49, passages 47 and 14, chamber 53, and leakage-groove 57, substantially as shown and described.

21. In a fluid-brake mechanism, the combination of the slide-valve 30 and its connections with the passage 36, chamber 37, piston 38, levers 41 and 43, valves 45, 48, and 51, springs 46, 49, and 52, passages 47 and 14, feed-groove 57, chamber 53, passage 54, and supplemental reservoir 55, substantially as shown and described.

22. In a fluid-brake mechanism, the combination of the slide-valve 30 and its connections with the passage 36, chamber 37, piston 38, spring 39, levers 41 and 43, valves 45, 48, and 51, springs 46, 49, and 52, passages 47 and 14, feed-groove 57, chamber 53, passage 54, and supplemental reservoir 55, substantially as shown and described.

23. In a fluid-brake mechanism, the combination of the slide-valve 30 and its connections with the passage 36, chamber 37, piston 38, lever 43, valve 48, spring 49, passage 14, feed-groove 57, chamber 53, passage 54, and supplemental reservoir 55, substantially as shown and described.

24. In a fluid-brake mechanism, the combination of the slide-valve 30 and its connections with the passage 36, chamber 37, piston 38, spring 39, lever 43, valve 48, spring 49, passage 14, feed-groove 57, chamber 53, passage 54, and supplemental reservoir 55, substantially as shown and described.

25. In a fluid-brake mechanism, the combination of the slide-valve 30 and its connections with passage 36, chamber 37, piston 38, lever 43, valves 48 and 51, springs 49 and 52, passage 14, feed-groove 57, chamber 53, passage 54, and supplemental reservoir 55, substantially as shown and described.

26. In a fluid-brake mechanism, the combination of the slide-valve 30 and its connections with the passage 36, chamber 37, piston 38, spring 39, lever 43, valves 48 and 51, springs 49 and 52, passage 14, feed-groove 57, chamber 53, passage 54, and supplemental reservoir 55, substantially as shown and described.

27. The combination of the brake-cylinder, the train-pipe, the auxiliary reservoir, and the main piston of triple-valve with a passage leading from the train-pipe to an auxiliary piston-chamber, the piston in which is adapted to be actuated by a proponderance of train-pipe pressure to open up communication between said auxiliary piston-chamber and the brake-cylinder during emergency application of the brakes and coincidently with the establishment of communication between the auxiliary reservoir and the brake-cylinder, and with means whereby the preponderance of pressure in the brake-cylinder and auxiliary reservoir during emergency applications may, after the brakes have been applied, flow back more slowly and nearly equalize with the pressure in the train-pipe, substantially as and for the purpose set forth.

GEORGE BAYLEY WILLIAMS.

Witnesses:
R. C. BRUNDAGE,
J. A. HERTZMAN.